UNITED STATES PATENT OFFICE.

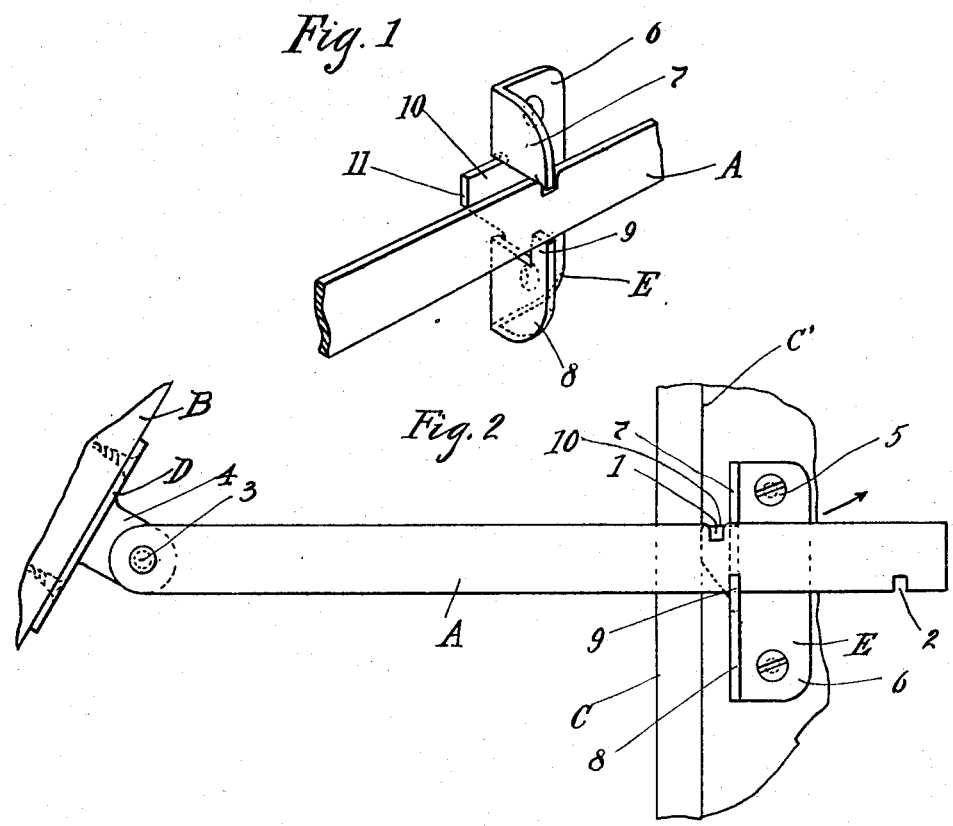

ANTON SCHROEDER, OF ST. PAUL, MINNESOTA.

STORM-SASH FASTENER.

1,366,597.

Specification of Letters Patent. Patented Jan. 25, 1921.

Application filed April 21, 1920. Serial No. 375,465.

*To all whom it may concern:*

Be it known that I, ANTON SCHROEDER, a citizen of the United States, residing at St. Paul, in the county of Ramsey and State of Minnesota, have invented certain new and useful Improvements in Storm-Sash Fasteners, of which the following is a specification.

This invention relates to storm window fixtures and more particularly to the stay bar thereof and the bracket employed in connection therewith for holding the window in open and closed position, the object of the invention being to provide a bracket having certain novel features whereby the operation of hanging or taking down the sash is simplified.

A further object of the invention is to provide a bracket which may be easily and cheaply stamped out of metal and at the same time be more effective in its operation.

In the drawings:

Figure 1 is a perspective view of a bracket embodying the invention, the stay bar being shown partly inserted therein and Fig. 2 is a side elevation of the stay bar inserted in the bracket.

The invention consists in the features of construction hereinafter described and claimed.
In the drawings A designates the stay bar, B the sash, C the window frame, and D the bracket on the sash pivotally connected with the stay bar. The stay bar consists of a comparatively long narrow strip of metal of uniform width having notches 1 and 2 in its upper and lower long edges. At its forward end it has pivotal connection 3 with the outwardly extending lug 4 of the bracket D the latter being firmly secured to the sash. Secured by means of screws 5 to the window frame C is my improved angle bracket E. This bracket comprises a base plate 6 having integral lugs 7 and 8 disposed at right angles thereto, said lugs being in spaced relation and in vertical alinement, opposite edges thereof adjacent the space between them being straight parallel and unbroken except for the projection 9 extending upwardly from the lug 8 at the entrance to said space.
The upper edge of the lug 9 is parallel with the lower edge of the lug 7, the lug being of a height to permit that part of the stay bar (Fig. 1) opposite the notch 1 to loosely enter into the space of the bracket. The lug 9, constitutes the sole means for preventing the stay bar from slipping out of the bracket. The plate 6 extends forwardly between the lugs 7 and 8 to form the extension 10 the outer vertical edge 11 thereof serving as a gage to facilitate the mounting of the bracket on the frame. C′ represents the edge of the ordinary rabbet of the frame with which the edge 11 of the bracket is brought flush in the process of mounting the bracket.

The bracket D forming an element of the "sash bower" patented by me Nov. 7, 1909, No. 933,587, has, as shown, an additional downwardly extending lug on the upper arm 5 corresponding to the lug 7, the lower arm 6 thereof corresponding to the lug 8 of my improved bracket. Two lugs obstructing the entrance to the space wherein the stay bar works has been found objectionable in that the removal of the bar from the bracket is rendered difficult and slow because two distinct acts must be performed in its removal. Firstly; the bar must be brought with its notch 1 to the arm 5 to receive the latter for the purpose of locating the narrow portion of said bar, and secondly; it must be carefully disengaged from said arm by moving it simultaneously downwardly and laterally into and through the space between the two lugs. Frequently the first position named is lost in the effort to find the second, in which case the whole process must be repeated.

By removing the upper lug and extending the lug corresponding to lug 9, the removal of the stay bar is much simplified. With the notch positioned as shown in Fig. 2 the bar is drawn in the direction of the arrow until the notch receives the lug 7, when it may be slipped laterally out of the bracket.

Further, in the process of closing the storm sash, the arms of the oparator must be extended laterally to opposite sides of the window frame to grasp the respective stay bars to pull them into the room. In doing so, there is a natural tendency to simultaneously pull the bars toward each other, especially when the window is a comparatively wide one. In the old type of bracket employed in my Patent No. 933,587 referred to in the foregoing, an undesirable amount of friction is created along the long edges of the bar as it is dragged against the two lugs. By having a single lug such as the lug 9, the friction surface is reduced by one-half, as well as the squeaking noise always attending the closing of the storm sash. It has been found that the stay bars in use become twisted, so that the upper edge of the bars lean inwardly toward the center of the window, thereby causing the notch 7 to engage the upper lug in the process of sliding the bar to close the window.

I claim:

In a device of the class described, the combination with a strap-like stay bar pivoted to a sash, so as to swing edgewise in a vertical plane, a part of the upper long edge thereof intermediate its ends being cut away to render it narrow thereat, of a bracket on the window frame, comprising a base plate and a vertically disposed plate at right angles thereto and extending edgewise into the window opening, said plate being cut away in its outer edge to form an opening having a restricted entrance to snugly receive, in said entrance part of the opening, said stay bar sidewise at its narrow part, and slidably support same in the other part thereof, the upper edge of said opening being at right angles to the surface of said base plate.

In testimony whereof I affix my signature.

ANTON SCHROEDER.